UNITED STATES PATENT OFFICE

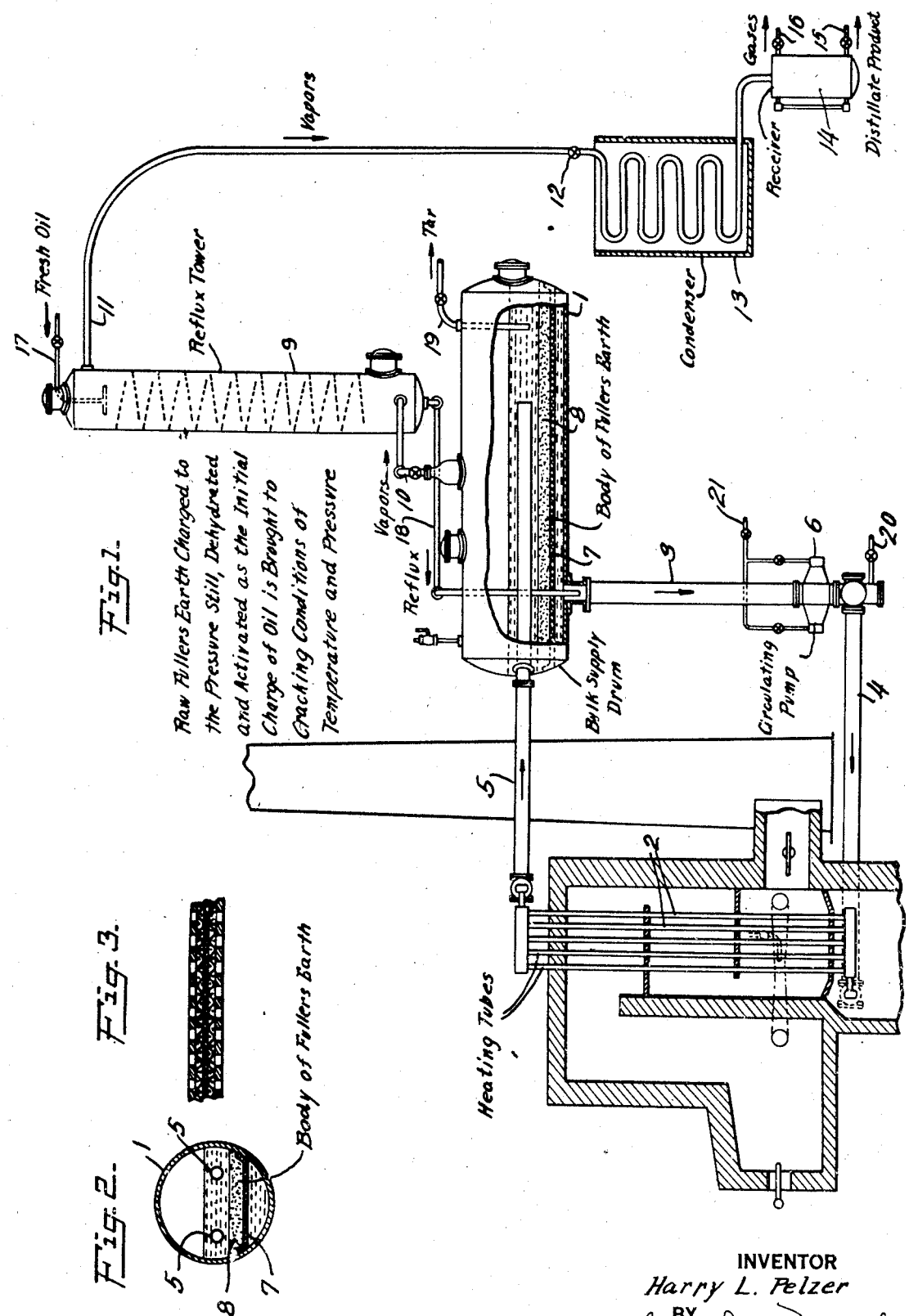

HARRY L. PELZER, OF HIGHLAND, INDIANA, ASSIGNOR TO SINCLAIR REFINING COMPANY, OF NEW YORK, N. Y., A CORPORATION OF MAINE

ACTIVATING FULLER'S EARTH AND THE LIKE

Application filed April 16, 1927. Serial No. 184,297.

This invention relates to improvements in pressure distillation operations for cracking heavier and higher boiling hydrocarbon oils, such as gas oil, for the production therefrom of lighter and lower boiling hydrocarbon oils, such as gasoline and gasoline-containing distillates. In particular, this invention relates to improvements in the handling of fuller's earth requiring activation or dehydration in such operations in which the oil while undergoing distillation is maintained in contact with the earth.

Fuller's earth, in its natural condition, that is as it is mined, contains both absorbed moisture and combined water. The amount of water present varies with different earths. The absorbed moisture may amount to about 5% to 6% by weight of the earth and the combined water may amount to about 8% to 15% for example. In some instances, fuller's earth is subjected to a preliminary calcining where it is mined, usually for the purpose of reducing transportation charges by removing easily separated water. The raw earth of commerce, however, whether or not it has been subjected to such preliminary calcining or drying, usually requires dehydration or activation for use in the oil cracking operations to which this invention particularly relates. In general, it is necessary to remove all or nearly of the absorbed moisture and all or nearly all of the water of constitution, although the amount of water which it is necessary to remove is somewhat specific to the individual earth. Hitherto, it has been customary to calcine or roast the fuller's earth in heated retorts or rotary kilns or the like in order to render the fresh earth suitable for use.

According to the present invention, raw earth is charged to the pressure still in which the cracking operation is carried out and it is heated to the temperature requisite for dehydration and activation while submerged in the charge of oil in the pressure still as that charge is brought to cracking conditions in the pressure distillation operation. The invention has several important advantages.

A well regulated dehydration or activation is secured and an earth of more uniform activity provided without overburning or underburning of the earth. In the ordinary calcining or roasting operation, any sintering due to local overheating or to general overheating reduces the efficacy of the earth. In carrying out the present invention, the heating of the earth is uniform to an extreme and local overheating is avoided. Thus, even at average temperatures higher than those to which the earth could safely be subjected in ordinary calcining or roasting operations, good results are secured. During dehydration, the earth is kept free from contact with air or combustion gases, and the active earth is kept free from contact with air or moisture by the surrounding oil. The water eliminated from the earth is rapidly vaporized and removed from all contact with the earth, passing off through the surrounding body of oil. In any event, the fuller's earth dehydrated and activated in accordance with the invention, seems to be peculiarly effective for the purposes of the invention. For example, it seems to have an increased tendency to retain sulphur and sulphur compounds. The dehydrated and activated earth is contacted with the oil while in its most effective condition. The present invention also eliminates a separate roasting or calcining operation.

The invention will be further described in connection with the accompanying drawings which illustrate, diagrammatically and conventionally, one form of apparatus adapted for the practice of the invention. In the accompanying drawings:

Fig. 1 represents in elevation, partly in section and with parts broken away, a pressure still system, Fig. 2 is a section through the drum of the still shown in Fig. 1, and Fig. 3 is an enlarged sectional view of a fragment of one form of screen for supporting the body of earth in the still.

Referring to the drawings, the pressure still illustrated is made up of a bulk supply drum 1, a battery of heating tubes 2, and circulating connections 3, 4 and 5 including a circulating pump 6. Arranged within the bulk supply drum is a support 7 adapted to carry a body of earth 8. The support 7 is arranged so that in operation the body of earth is below the normal liquid level in the bulk supply drum 1. The support 7 is of construction to permit free passage of oil while retaining the finely divided earth. One suitable form, illustrated in Fig. 3, consists of a central fine screen arranged between two coarser screens in turn arranged between a pair of perforated plates. Vapors from the bulk supply drum 1 enter the reflux tower 9 through connection 10. Vapors from the reflux tower pass through connection 11 and valve 12, by which the pressure in the system may be regulated, to the condenser 13. This condenser discharges into the receiver 14. The distilled product is discharged from the receiver through connection 15 and uncondensed vapors and gases through connection 16. Fresh oil to be supplied to the operation is introduced into the upper end of the reflux tower 9 through connection 17. Reflux condensate and admixed unvaporized fresh oil flow from the lower end of the reflux tower back to the still through connection 18. Connection 19 is provided for discharging pitch-laden oil during operation, and connection 20 for pumping out the still at the end of a run and charging it at the beginning of a run. A part of the fresh oil supplied to the operation may be introduced through the bearings of the circulating pump 6 for cooling and lubrication by means of connection 21.

In carrying out the present invention, at the beginning of a run, raw fuller's earth is charged into the bulk supply drum 1 to form a body of the desired depth, say 10 to 20 inches for example, on the support 7. The fuller's earth may be, for example, from 16 to 30 mesh. An initial charge of oil is then pumped into the still, and the still brought to cracking conditions of temperature and pressure. During this initial period of operation, the oil is circulated downwardly through the bed of fuller's earth, upwardly through the heating tubes, downwardly through the bed of earth, and so on, as the temperature of the oil circulating in the still is gradually increased. As the temperature is increased, dehydration of the raw earth begins and the expelled water escapes from the still as vapor. When the oil begins to vaporize, pressure is gradually built up in the system to the desired value, and when this point is reached the cracking operation is carried on in the usual manner. With some earths, and with some charging stocks, the dehydration of the earth may be substantially complete before substantial vaporization of the oil in the still begins. With other earths, the required dehydration may be effected only at the higher temperatures reached under pressure.

In operation to produce a gasoline-containing distillate from gas oil, for example, the temperature of the hot oil as it is discharged from the battery of heating tubes may be upwards of 750° F. and a pressure in the system, for example, may be maintained in the neighborhood of from 100 to 150 pounds per square inch. Higher or lower pressures, however, may be employed. After the still is brought to operating conditions of temperature and pressure, it is advantageous to regulate the supply of fresh oil and the discharge of pitch-laden oil or tar to maintain the concentration of pitch constituents below saturation in the oil entering the battery of heating tubes. Fresh oil may be supplied, for example, at a rate upwards of 2,500 gallons per hour and pitch-laden oil discharged at a rate upwards of 1,500 gallons per hour.

It will be understood that the invention is useful in connection with the operation of stills of construction and arrangement other than that in connection with which the invention has been more particularly described. Whatever the form of still, to avoid local heating, it is advantageous to arrange the body of fuller's earth so that it is free from any surfaces through which heat is transferred. The invention has been found of special value and application in connection with the operation of stills of the type more particularly described herein.

I claim:

1. In cracking petroleum oils by distillation under superatmospheric pressure while maintaining the charge of oil in the still in contact with a body of fuller's earth, the improvement which comprises initially supplying the fuller's earth to the distilling operation in a raw condition and dehydrating and activating the fuller's earth while in contact with the charge of oil in the still as the oil is brought to cracking conditions of temperature and pressure.

2. In the cracking of petroleum oils by distillation under superatmospheric pressure, the improvement which comprises carrying out the distillation while maintaining in contact with the still charge undergoing distillation a body of initially raw fuller's earth, and dehydrating and activating the body of fuller's earth while submerged in the still charge.

In testimony whereof, I have subscribed my name.

HARRY L. PELZER.